United States Patent
Nishimura et al.

(10) Patent No.: US 7,220,453 B2
(45) Date of Patent: May 22, 2007

(54) CLOTH PREPREG AND WET PROCESS FOR MANUFACTURING THE SAME

(75) Inventors: Akira Nishimura, Ehime (JP); Kiyoshi Homma, Shiga (JP); Ikuo Horibe, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/865,829

(22) Filed: Jun. 14, 2004

(65) Prior Publication Data

US 2004/0224093 A1 Nov. 11, 2004

Related U.S. Application Data

(62) Division of application No. 09/079,468, filed on May 15, 1998.

(30) Foreign Application Priority Data

May 15, 1997 (JP) .................................. 9-143046

(51) Int. Cl.
*B05D 3/02* (2006.01)
(52) U.S. Cl. ...................... 427/365; 427/366; 427/369; 427/370; 427/389.9; 427/394; 427/430.1; 427/434.2
(58) Field of Classification Search .................... None
See application file for complete search history.

(56) References Cited

U.S. PATENT DOCUMENTS

| 3,897,533 | A | | 7/1975 | Hani et al. |
| 4,092,453 | A | * | 5/1978 | Jonda .......................... 442/185 |
| 4,906,506 | A | | 3/1990 | Nishimura et al. |
| 4,968,767 | A | | 11/1990 | Burba et al. |
| 5,037,284 | A | | 8/1991 | Angell et al. |
| 5,100,713 | A | * | 3/1992 | Homma et al. .............. 428/102 |
| 5,168,006 | A | * | 12/1992 | Inoguchi et al. ............ 442/187 |
| 5,447,785 | A | * | 9/1995 | Kishi et al. .................. 442/60 |
| 5,455,107 | A | | 10/1995 | Homma et al. |
| 5,599,612 | A | * | 2/1997 | Muraki et al. ................ 442/60 |

(Continued)

FOREIGN PATENT DOCUMENTS

DE 33 41 292 A 1/1985

(Continued)

OTHER PUBLICATIONS

Abstracts and translation of JP 10-317250, Dec. 1998.*

(Continued)

*Primary Examiner*—Erma Cameron
(74) *Attorney, Agent, or Firm*—Morrison & Foerster LLP

(57) ABSTRACT

A wet process for manufacturing a cloth prepreg with a uniform fiber distribution and large cover factor comprises impregnating a woven fabric with a diluted resin and drying, which fabric has a number of crossing points of warp and weft in the range of 2,000 to 70,000/m$^2$, which process further comprises at least one of the steps (A) and (B), namely
(A) a step of distributing a line-shaped binder on the fabric to fix the yarn flatness prior to impregnating the fabric with a resin diluted with a solvent, at least 80% of which solvent is a nonsolvent of the binder and,
(B) a step of calendering the woven fabric after drying.

12 Claims, 3 Drawing Sheets

U.S. PATENT DOCUMENTS

| | | | |
|---|---|---|---|
| 5,626,916 A * | 5/1997 | Kishi et al. | 427/386 |
| 5,714,419 A | 2/1998 | Choate | |
| 5,783,278 A * | 7/1998 | Nishimura et al. | 428/102 |
| 5,817,409 A * | 10/1998 | Stephan et al. | 428/219 |

FOREIGN PATENT DOCUMENTS

| | | | |
|---|---|---|---|
| DE | 44 12 376 A | | 10/1995 |
| EP | 0 133 893 | | 3/1985 |
| EP | 0 409 993 | | 1/1991 |
| EP | 0 453 053 A | | 10/1991 |
| EP | 0 658 644 | | 6/1995 |
| EP | 0756027 | | 1/1997 |
| EP | 1464743 | * | 10/2004 |
| GB | 871 117 A | | 6/1961 |
| GB | 1 054 795 A | | 1/1967 |
| GB | 2091633 | * | 8/1982 |
| JP | 59-064326 | | 4/1984 |
| JP | 7-300739 | | 11/1995 |

OTHER PUBLICATIONS

Tortora, Phyllis, Fairchild's Dictionary of Textiles, Fairchild Publications, New York, 1996, p. 523.

* cited by examiner

CLOTH PREPREG AND WET PROCESS FOR MANUFACTURING THE SAME

RELATED APPLICATIONS

This divisional application claims priority from parent application Ser. No. 09/079,468, filed May 15, 1998, the entire disclosure of which is incorporated herein by reference.

TECHNICAL FIELD

This invention relates to a cloth prepreg used for manufacturing fiber reinforced plastic (hereafter referred to as FRP) and a wet process for manufacturing the prepeg.

BACKGROUND ART

FRP, carbon fiber reinforcing plastic (CFRP) in particular, has excellent specific strength and specific modulus, allows manufacture of lightweight structural materials, such as interior material for aircraft, and can therefore greatly reduce fuel cost.

For secondary structural materials of aircraft such as for flaps, fairings and ailerons, and interior materials such as for toilets, ceiling panels, window panels and cabin trunks, in particular, a honeycomb sandwich structure with a honeycomb as the core material and CFRP as the skin material is used in many cases. However, because the carbon fiber is expensive, it can be applied only to a limited extent, even in aircraft where lightweight is most wanted.

These honeycomb sandwich structures are usually manufactured by a honeycomb cocuring method, in which a cloth prepreg is placed on the honeycomb and is heat-pressed to cure the prepreg and bond the CFRP at the same time. However, in the event that a large void exists in the prepreg where carbon fiber does not exist at the place contacting the honeycomb core, such an opening causes a hole in the CFRP skin. To cope with this problem, prepregs comprising conventional 3,000 filament carbon fiber yarn, which is thin and expensive, have been used.

On the other hand, a manufacturing method of a flat yarn woven fabric having uniform fiber distribution and large cover factor, using thick reinforcing fiber thread, has been proposed in JP-A-07-300389. However, this method requires weaving apparatus provided with a weft supply device to prevent twisting and a special apparatus to retain the flatness of the yarn. Furthermore, this woven fabric is unstable because the flatness of yarn is easily lost during the drying step employed when a wet process of manufacturing the prepreg (which is otherwise excellent in resin impregnation to the woven fabric) is employed.

As a structural form stabilizing measure during the prepreg processing, the use of a low melting point polymer has been proposed to maintain the flatness of the constituent yarns. However, the flatness was lost during the wet process for manufacturing a prepreg, resulting in a mesh-like woven fabric with a narrow yarn. Observing how the flatness of yarn is lost during the prepreg process, we found that the flatness of woven yarn can be maintained during impregnation of the resin diluted with a solvent, but a while after the woven fabric enters the drying zone, the flatness gradually begins to be lost.

This invention addresses the abovementioned problems of conventional technology and provides a cloth prepreg of a large cover factor which has uniform fiber distribution, as well as a low cost wet process for manufacturing a cloth prepreg having a large cover factor.

SUMMARY OF THE INVENTION

To solve the above problems, this invention provides a wet process for manufacturing a cloth prepreg with a uniform fiber distribution and large cover factor.

According to one aspect, the invention provides a cloth prepreg comprising a woven fabric impregnated with a resin and having a binder distributed line-like on the fabric to maintain yarn flatness, which fabric has a number of crossing points of warp and weft in a range of from 2,000 to 70,000/m$^2$, preferably 2,500 to 25,000/m$^2$, a cover factor of at least 90%, warp and weft yarns substantially, free from twist and having a width of 3 to 20 mm and a flatness as defined by a ratio of yarn width to yarn thickness of at least 20.

According to another aspect, the invention provides a wet process which comprises impregnating a woven fabric with a diluted resin and drying, which fabric has a number of crossing points of warp and weft in the range of 2,000 to 70,000/m$^2$, which process further comprises at least one of the steps (A) and (B), being (A) a step of distributing a line-shaped binder on the fabric to fix the yarn flatness prior to impregnating the fabric with a resin diluted with a solvent, at least 80% of which solvent is incompatible with the binder and, (B) a step of calendering the woven fabric after drying.

Preferably the woven fabric has a cover factor of 70% or more, more preferably 90% or more, and preferably comprises yarns substantially free from twist. More preferably, the process comprises the step (A), wherein the number of crossing points is in the range of 2,000 to 70,000/m$^2$, still more preferably 2,500 to 25,000/m$^2$, the cover factor is 90% or more and the warp and weft yarns are substantially free from twist and have a width of 3 to 20 mm and a flatness as defined by a ratio of yarn width to yarn thickness of 20 or more. Still more preferably, a nonwoven fabric is used as the line-shaped binder.

Preferably, the number of the filaments of the warp and weft is 6,000 or more, the woven densities of the warp and weft are substantially the same and the fabric is woven from carbon fiber such that the carbon fiber weight of the woven fabric is within a range of 140 to 240 g/m$^2$.

Figure 1:
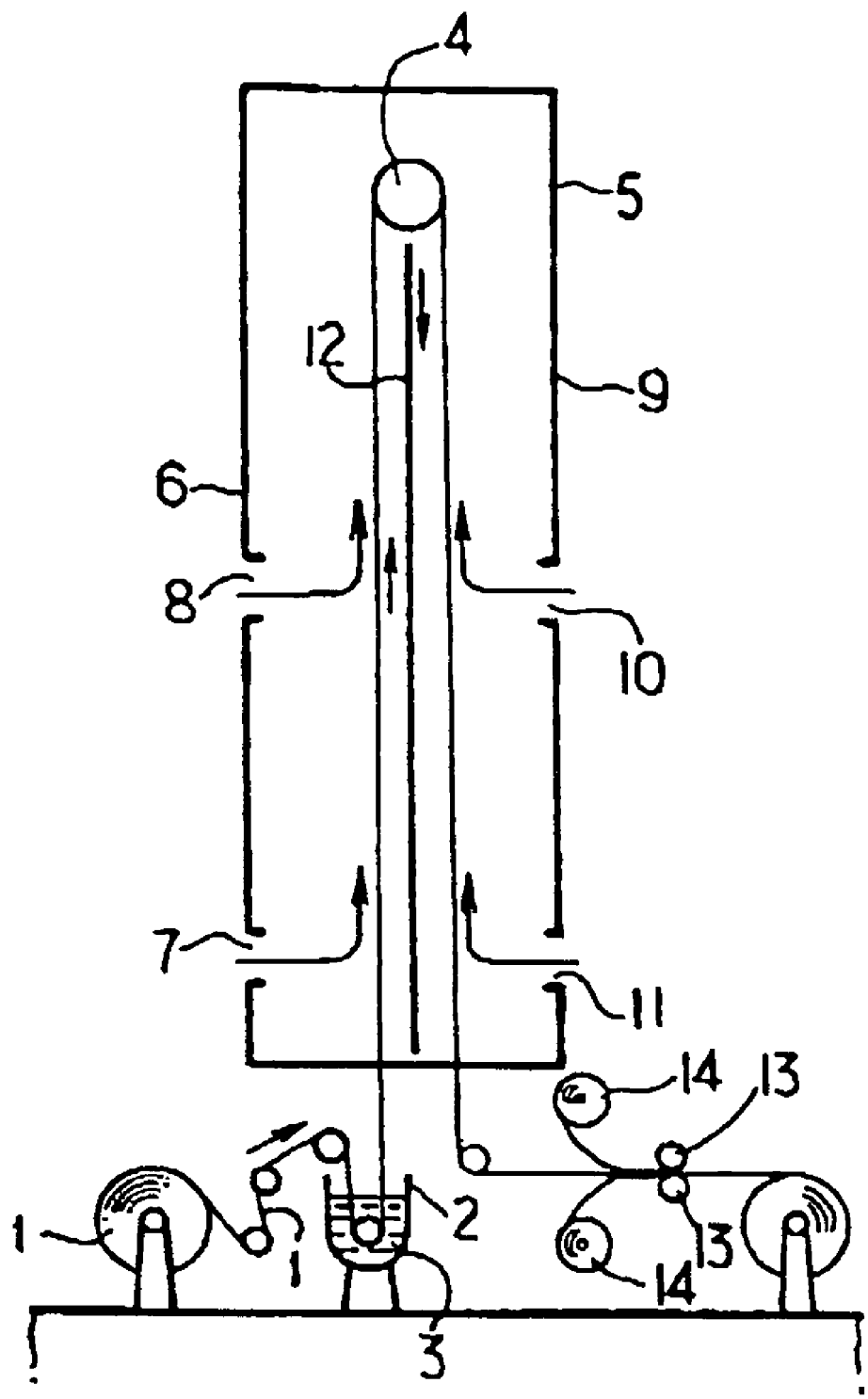
FIG. 1 is an overview vertical section of an apparatus employed during a prepreg manufacturing process illustrating one wet process embodying the invention for manufacturing a prepeg.

Wherein:
1. Reinforcing woven fabric 2. Resin bath
3. Diluted resin 4. Roll
5. Vertical drying furnace 6, 9. Wall
7, 8, 10 and, 11. Hot air blowhole 12. Separator
13. Calendar roller 14. Releasing paper
15. Woven fabric 16. Warp
17. Weft 18, 19. Binder
20. Nonwoven web

PREFERRED EMBODIMENT OF THE INVENTION

Preferred embodiments of the invention will now be described in more detail with reference to the accompanying drawings.

One wet process for manufacturing a prepreg embodying this invention is illustrated with reference to FIG. 1. In FIG. 1, diluted resin 3 is placed in a resin bath 2 located beneath a vertically dispersed furnace 5, and into this resin bath 2, a rolled woven fabric 1 is dipped by drawing it out at a speed of 1.5 m/minute to 5 m/minute, to impregnate resin into the fibers of the woven fabric and pass the fabric 1 through the drying furnace 5, over a roll 4 located at the top of the drying furnace 5, so as to provide a drying zone of sufficient length.

During passage of the woven fabric impregnated with diluted resin linearly upwards to the roll 4, hot air is blown laterally, directly at the woven fabric surface from blowholes 7 and 8 in the side wall 6 facing the upward travel path of the woven fabric, to dry the solvent to a certain degree and then, as the travel path of the woven fabric changes to move downwardly from the roll 4, hot air is blown laterally, directly at the woven fabric surface from blowholes 10 and 11 in side wall 9 facing the downward travel path of the woven fabric to dry the remaining solvent. In addition, it is preferable for the hot air blowholes to be distributed so as to provide 2 to 4 in each side of wall 6, facing the upward travel path, and wall 9, facing the downward travel path and to set the hot air from different respective blow holes at different temperatures so that the drying condition of the solvent can be controlled. Furthermore, by attaching a separator 12, at the center of the vertical drying furnace 5, parallel to the woven fabric surface, the drying temperature can be changed in each respective drying zone in which the woven fabric travels upwardly and downwardly so that the temperature in each drying zone can be controlled independently.

The above describes a wet process for manufacturing a prepreg, and this is not different from a conventional method in any way. However, in certain processes embodying this invention, a calendar 13, composed of a pair of rollers 13 is installed to pressurize the hot prepreg impregnated with resin after it comes out of the drying zone. When the prepreg is warm, yarn widening is easy because the resin is soft. The temperature of prepreg during yarn widening is preferably 50° C. to 150° C. If it is below 50° C., the resin may become hard, making yarn widening difficult. Furthermore, when it exceeds 150° C., curing may be accelerated and control of tackiness of the prepreg after returning to room temperature may become difficult. In addition, if the prepreg temperature is high and the resin viscosity is high, resin may become glued to the calendar rollers. In this case, gluing of resin can be prevented by coating the rollers with silicone resin or fluoric resin.

Alternatively, gluing of resin to the rollers can be prevented by supplying releasing paper 14 impregnated with silicone resin between the roller and the prepreg. This prevents the prepreg from making direct contact with the roller. Furthermore, when the prepreg temperature is low and yarn widening is difficult, the yarn can be widened by a calendar roller heated to 50° C. to 150° C. Another way of widening the yarn using a calendar roller is by winding the cooled prepreg and preheating to a temperature to 50° C. to 150° C.

To prevent damage of fiber by the calendar rollers, it is recommended to leave about 1 to 6% of solvent of the dried resin in the prepreg. For pressurization of prepreg by calendar rollers, it is preferable for the linear pressure to be about 1 kg/cm to 50 kg/cm. If the linear pressure is below 1 kg/cm, yarn widening may become incomplete so that the openings formed by warp and weft cannot be closed. Furthermore, if the linear pressure exceeds 50 kg/cm, the weft of the cloth prepreg may zigzag because the number of crossing points of warp and weft is few.

Linear pressure mentioned here means the value obtained by dividing the total load (kg) acting on the roller by the width of woven fabric (cm) that passes through the calendar.

For the pressurization by calendar rollers, resin impregnated cloth prepreg can be inserted between one roller and a flat board, or between 2 rollers. The materials of the roller or flat board can both be metals or a combination of metal and rubber. The diameter of the roller is usually about 20 to 300 mm.

If the cover factor of the reinforcing woven fabric used in this invention is more than 70%, the yarn can be widened to be processed into a prepreg having a cover factor of 90% or more. To manufacture woven fabric with a small number of crossing points of the warp and weft and at the same time, with a cover factor of 90% or more, a special apparatus to maintain the flatness of the warp and weft, for example, as described in EP-A-0589286, is required at weaving. However, if it is a woven fabric with a cover factor of more than 70% to 90%, woven fabric can be manufactured by a conventional weaving operation, enabling manufacturing of woven fabrics at low cost.

Here, the cover factor is a factor related to the openings in the woven fabric or the cloth prepreg in which only the resin fills the openings. If the area S1 is the area of the fabric or prepreg and S2 of the openings in the area S1, the value defined by the formula given below is the cover factor. When it is difficult to measure the area of the openings in a woven fabric of the prepreg, a projection of the prepregs can be used to determine the area of the openings.

$$\text{Cover factor, } cf = [(S1-S2)/S1] \times 100.$$

The reinforcing fiber yarn of the warp and weft that constitutes the woven fabric of this invention, is substantially twist-free, in other words, twisting of about 4 turns/m when the yarn is taken out vertically can be allowed. Because the yarn can be widened by a calendar roll in the wet process for manufacturing, in accordance with this invention, a prepreg, the fabric in the first prepreg may have a sufficiently large cover factor.

Furthermore, it is preferable for the number of twists to be zero, and the multi-filament to be distributed substantially in parallel, to attain uniform widening of the yarn. When there is twisting in the reinforcing fiber yarn, the yarn becomes constricted, requiring widening of the narrow part of yarn. This requires a severe condition such as enhancing the calendar roller pressure. However, when the yarn twisting is zero, the yarn can be widened without application of severe conditions.

For the reinforcing fiber for this invention, glass fiber, polyamide fiber or carbon fiber that has high strength and high modulus can be used. Of these, carbon fiber whose tensile modulus is 200 GPa or more, and where tensile strength is more than 4,500 MPa according to JIS R 7601, not only has high strength and high modulus but also has excellent impact resistance. Moreover, if the resin is a phenol resin, it has excellent non-inflammability because carbon fibers do not burn.

When the reinforcing fiber is a carbon fiber yarn, the number of filaments of the yarn should be from 6,000 to 24,000, from the viewpoint of making yarn widening easy by a calendar roller, by reducing the number of crossing points of the warp and weft of woven fabric, and manufacturing prepreg of thin woven fabric. As compared with the conventional carbon fiber yarn of 3,000 filaments used for aircraft materials, the yarn may be thicker by 2-fold to 8-fold, which improves the productivity during manufacture of carbon fiber and reduces the cost as a result. Furthermore, it is not preferable for the number of filaments of carbon fiber to exceed 24,000, because the number of crossing points of the warp and weft becomes few, causing slippage (or shifting) of the yarn in the woven fabric during the prepreg manufacturing process, resulting in degradation of the prepreg quality.

In this invention, if the fabric weave slips during the prepreg manufacturing process, the crossing point of the warp and weft should be fixed by a binder deposited so as to assume a line-like configuration. From the viewpoint of low cost and a minimal amount of binder, it is preferable that this binder be a low melting point polymer, for example, of nylon copolymer, polyester copolymer, polyethylene or polypropylene. Of these, nylon copolymer glues well with carbon fiber, requiring only a minimal amount of binder, and also glues well with the matrix resin of the FRP. These low melting point polymers may be inserted into the woven fabric simultaneously with the warp and/or weft of the reinforcing fiber filament and heated to above the melting point of the binder on the weaving machine to melt the binder, to produce bound reinforcing woven fabric. Thus, a binding process of reinforcing woven fabric can be carried out at low cost.

In general, the low melting point polymer preferably has a melting point of 100 to 180° C. If it is below 100° C., the binder is apt to melt during the drying operation, while if it is above 180° C., too high a temperature may be needed for melting and any sizing agent present on the reinforcing fibers may be subject to degradation.

In this invention, if the line-like configuration of the binder is that of a fiber, a small amount of binder is effective to prevent narrowing of the constituent yarn. However, this can also be achieved with a nonwoven web of binder, individual fibers of which also provide line-like configuration.

In this invention, it is preferable for the binder to be a nylon copolymer with a melting point of about 100° C. to 140° C., and in particular, when present in FRP, a copolymer of nylon 6 and nylon 12, copolymer of nylon 6, nylon 66 and 610, copolymer of nylon 6, nylon 12, 66 and 610, are preferable for their good resin gluing characteristic. In addition, because its melting point is low, it is easy to manufacture woven fabrics processed with binders. The melting point of nylon copolymer and solvent solubility are determined by the degree of nylon polymer crystallinity disarray at copolymerization, according to the combination of various said nylon polymers and mixing ratios, which means that some types of nylon copolymer can be compatible or incompatible with alcohol, such as methanol. Therefore, a non-alcohol type, such as MEK, acetone, or toluene is used as solvent for nylon copolymer compatible with alcohol.

Figure 3:
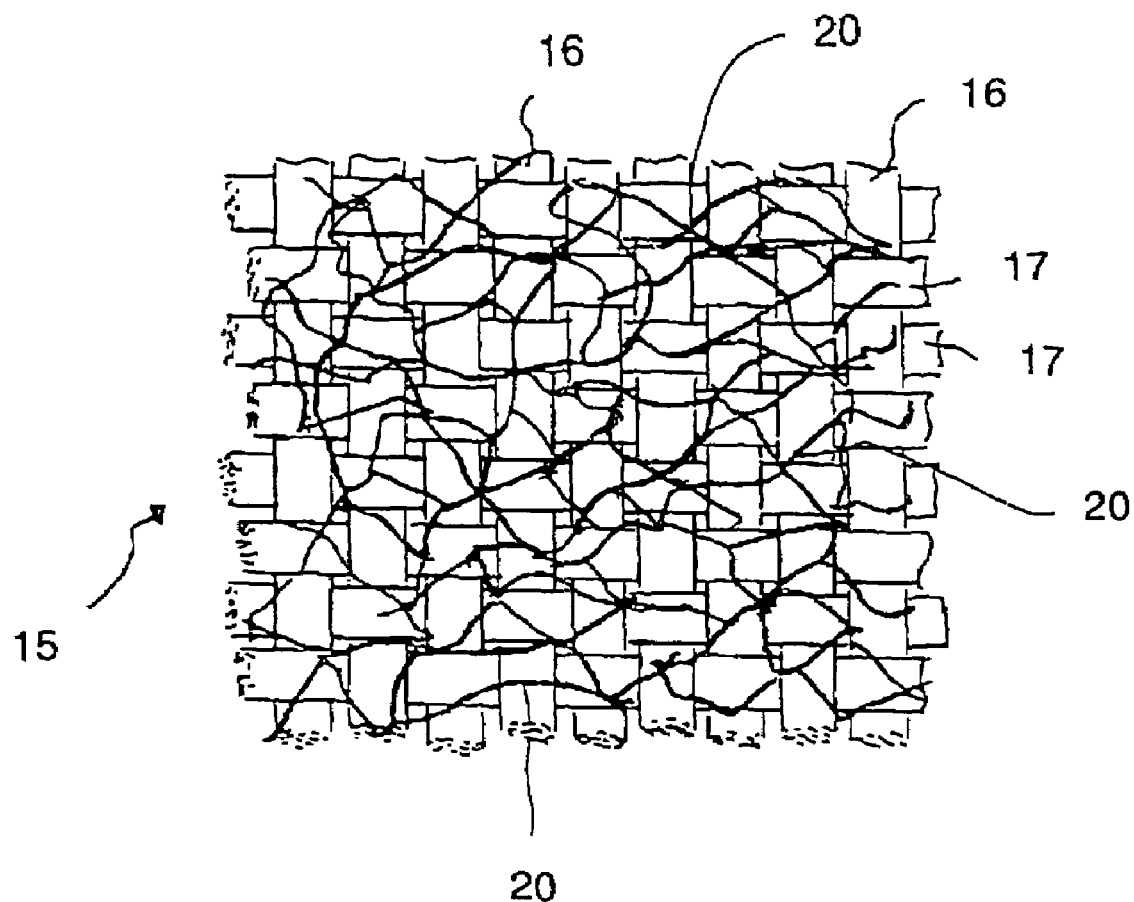
FIG. 3 is another example of partial plan view of a prepreg embodying the invention.

Here, the line-like binder of this invention means that the binder is line-shaped, such as a fiber or fiber product, e.g. a yarn, a tow, a non-woven fabric made up of fibers and a low melting point sheath of a sheath core fiber or yarn as later described. The binder may be co-woven with the constituting warp or weft. Another alternative of the line-shaped binder is a nonwoven web as shown in FIG. 3. In this case, too, nylon copolymer is preferred for the reason stated above. A line-like deposited binder may also be imparted to the woven fabric by a printing technique in which binder paste is printed on the woven fabric.

Here, a binder is regarded as "compatible" with a solvent if, when the binder is placed in a beaker containing the solvent at 20° C., the yarn shape disappears after it is left for 10 minutes, or if the yarn dissolves and no trace of yarn is seen. The binder is regarded as "incompatible" if the yarn shape still remains.

Furthermore, in a method embodying this invention, methanol is one of the preferred resin solvents as it is low in price, the boiling point is low, and drying during the prepreg process is easy. For these reasons, an alcoholic type solvent, such as methanol is used as diluent, and a low melting point polyester composed of a polyester copolymer or nylon copolymer incompatible with methanol can be used as binder.

In addition, preferable polyester copolymers are those which contain a specified amount of aliphatic dicarboxylic acid such as adipic acid and sebacic acid, aromatic dicarboxylic acids, such as phthalic acid, isophthalic acid and naphthalene dicarboxylic acid, and/or alicyclic dicarboxylic acids, such as hexahydroterephthalic acid and hexahydroisophthalic acid, and aliphatic and alicyclic diol, such as diethylene glycol and propylene glycol and is a copolymer ester to which is added an oxyacid such as parahydroxyl benzoic acid and is a polyester obtained by adding and copolymerizing isophthalic acid and 1,6-hexane diol to terephthalic acid and ethylene glycol. Binders, essentially, do not form a matrix resin of an FRP, and become completely heterogeneous depending on the resin used, so the amount should be as small as possible, preferably in the range of 0.5 to 15 g/m$^2$. When it is less than 0.5 g/m$^2$, binding of flat woven yarn in the width direction may become weak and during wet prepreg processing, it may be impossible to prevent loss of flatness of the yarn. Furthermore, if it exceeds 15 g/m$^2$, FRP mechanical characteristics may deteriorate. If it is within the range of 0.5 to 15 g/m$^2$, loss of flatness can be prevented, and the mechanical characteristics of an FRP obtained from the prepreg may not deteriorate so much.

Furthermore, in, a method embodying this invention, because binders prevent loss of flatness of woven yarn, the amount of binder per yarn distributed is important. It is preferable for the amount of binder to be in the range of 0.2 weight % to 2 weight % relative to the weight of the reinforcing fiber yarn.

For the resin used in a method embodying this invention, a thermosetting resin such as an epoxy resin, unsaturated polyester resin, vinyl ester resin or phenol resin may be used.

A characteristic of a cloth prepreg obtained by the method of this invention is that the number of crossing points of the warp and weft is 2,000 to 70,000 per square meter, and the cover factor is preferably at least 90%, more preferably at least 97%, still more preferably more than, 97%. Because the number of crossing points is less as compared with conventional reinforcing woven fabric, it is excellent in deep drawability.

Furthermore, because the yarn can be widened or flattened by a calendar roll with its few crossing points, the prepreg has a high cover factor. For these prepregs, a hole is less likely to be opened by resin omission in the CFRP of the unpressurized part, even if it is formed by laminating a few layers on the honeycomb and formed by a honeycomb cocuring method. Moreover, when the cover factor is more than 97%, the opening area of the woven fabric is small and because the reinforcing fiber is a carbon fiber, it has excellent fire resistance. With these kinds of prepreg, flames are blocked in the event of fire.

The "number of crossing points" referred to herein denotes the number of crossing points of warps and wefts. For example, in the case of a plain weave in which each warp and each weft crosses, the number of crossing points per square meter is the product of the number of the warps per meter and the number of the wefts per meter, and in the case of 2/2 will in which each warp or weft crosses with each two wefts or each two warps, the number of crossing points per square meter is the product of the number of the warps or wefts per meter and a half of the number of wefts or warps per meter.

For a cloth prepreg whose warp and weft are composed of carbon fiber of more than 6,000 filament, with a woven density of the warp and weft almost, if not exactly, the same, and the carbon fiber weight of the woven fabric is 140 to 240 g/m$^2$, it is easily possible to make the mechanical characteristics pseudo-isotropical, by cross-laminating the prepreg with the carbon fiber in the (0°/90°) direction and the prepreg with the carbon fiber in the (+45°/−45°) directions. Furthermore, the cloth prepreg becomes thin and lightweight with the usual resin amount of 30 to 60-weight %, resulting in a lightweight sandwich structure.

This is preferably used as an interior fabric for aircraft. Since, as compared with a conventional fabric having the same plain weave with a carbon fiber yarn of about 3,000 filament and the same carbon fiber weight, the number of crossing points of the warp and weft is less than ¼, it is excellent in deep drawability and since the carbon fiber filament is thick, the cost is low.

If it is composed of carbon fiber with warp and weft yarns of more than 12,000 filaments, the yarn woven density of the warp and weft is almost the same, and the carbon fiber weight of the fabric is 140 to 240 g/m$^2$, the number of crossing points becomes less than 1/16 of the conventional carbon fiber fabric. This is preferable in the sense that the cost will be lower and a thin and lightweight prepreg can be obtained using a correspondent amount of resin.

If the average area of openings of cloth prepreg formed by the warp and weft is below 1.5 mm per opening, holes are not formed by honeycomb cocuring. Therefore a honeycomb sandwich panel with a surface fabric using smooth surface CFRP can be obtained.

The average area of the opening in this invention means the average value of 100 openings filled with resin but no carbon fiber, which is generated from the openings formed by the warp and weft.

By optimizing the conditions of the wet process for manufacturing a prepreg of this invention, such as the thickness of reinforcing fiber filament, yarn density of the warp and weft of woven fabric, fiber weight of woven fabric, solvent quantity of wet prepreg before passage through a calendar roller, roller linear pressure and the prepreg temperature at rolling, a prepreg with no opening formed by the warp and weft can be obtained because the reinforcing fiber opens and widens. Such a prepreg can completely block flames in the event of fire, and prevent holes in the FRP skin from occurring due to resin omission in a sandwich structure formed by the honeycomb cocuring method. Therefore, a sandwich structure of a uniform quality can be obtained and is ideal for aircraft components that require rigid quality control.

A "closed state" referred to herein means a state in which the number of openings formed by the warp and weft of fiber before prepreg processing is completely closed for more than ⅔ of the total, and even if there are gaps which are not completely closed due to fluctuation in conditions, the opening area is small and substantially the same effect as with a closed state can be obtained.

The structure of woven fabrics used in this invention is not particularly limited; however plain weave is preferable, because the form is stable and can prevent weave slippage during the prepreg process.

Figure 2:
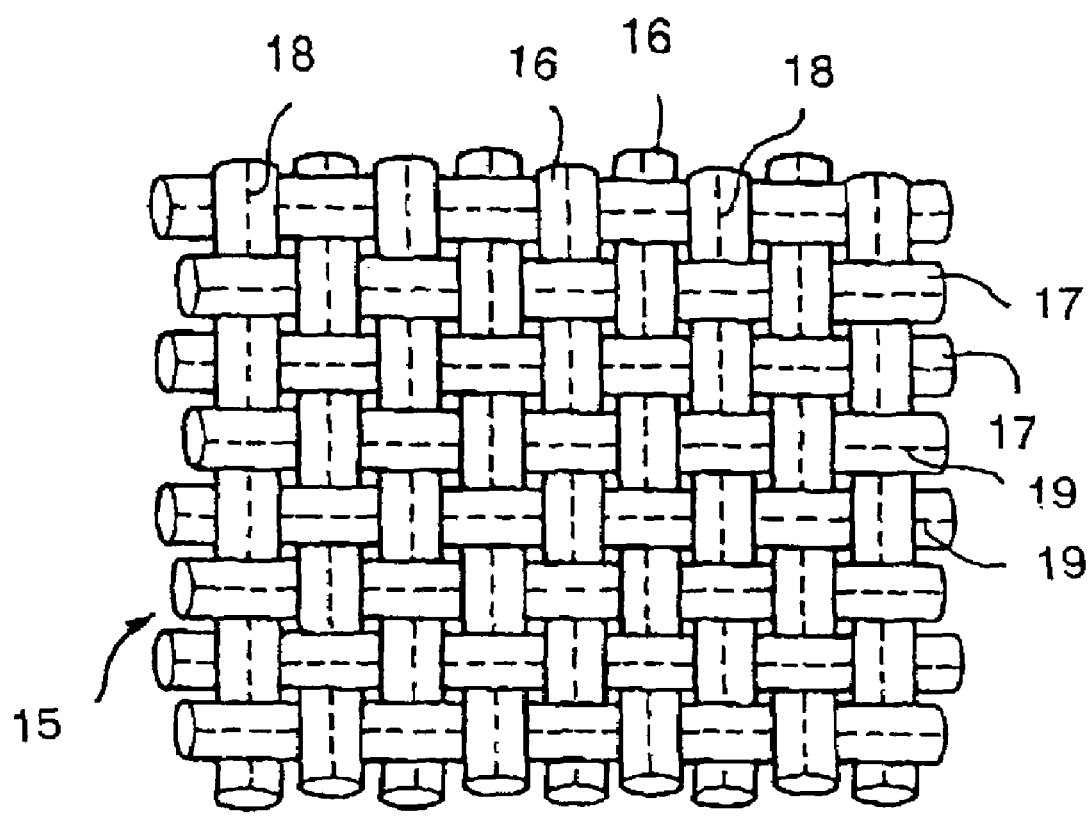
FIG. 2 is an example of partial plan view of a reinforcing carbon fiber woven fabric of a prepreg embodying this invention.

FIG. 2 shows one example of a flat yarn fabric 15 fixed with a binder assuming a line-like configuration ("line-shaped"), used in a wet process for manufacturing cloth prepreg embodying this invention. The woven yarn of the warp 16 and weft 17 is composed of the flat reinforcing fiber yarns with a yarn width of 3 to 20 mm, a ratio of yarn width to the yarn thickness of more than 20, a number of the crossing points of the warp 16 and weft 17 of 2,500 to 25,000 per square meter and a cover factor of more than 90%.

Here, the yarn thickness means, the thickness of yarn at the average value of N=10, obtained by reading the scale of a micrometer when the spindle is rotated gently and the measurement side lightly contacts the sample surface for the ratchet to sound 3 times, in accordance with JIS-R3414, Section 5.4.

In FIG. 2, binder 18 and binder 19 are fixed around the dotted line at the center of the yarn width in the two directions of the flat warp 16 and weft 17, and the warp and weft are fixed at the crossing section to fix and bind the flat warp and weft with the binder for the entire width.

Here, binder direction does not necessarily have to be in the two directions of the warp and weft. It depends on the thickness of the woven yarn, woven density and binding degree of the woven yarn. However, when the binder is glued to the weft, the entire warp is bound by the binder, by which the change in the fabric structure by tension acting in the warp direction of fabric, in other words, losing flatness by crimp interchange can be prevented.

It is not always necessary to position the binder at the center of the yarn width. It can be positioned slightly misaligned to the left or right of the weft width; for instance, it can be located between the warp and warp or between the weft and weft of reinforcing woven fabric. Furthermore, when the warp and weft are fixed at their crossing part, although this stabilizes fabric dimension, it is not essential. It can be positioned between the warp and warp or between the weft and weft. It is not necessary to fix the warp and weft with a binder. If the binder is coated in line-shaped form on the entire width of the flat warp and weft, surface tension, loss of flatness due to hot air penetration and crimp interchange can be prevented.

In a method embodying this invention, the binder does not have to be applied alone, but can be a covering layer on an auxiliary (or core) yarn of low heat shrinkage. By covering binder yarn around an auxiliary yarn with low heat shrinkage, and manufacturing a fabric using this together with the warp and weft, and heating to a temperature above the melting point of the binder, a fabric for a prepreg of this invention can also be manufactured.

By heating and melting at a temperature higher than the melting point of a low melting point polymer and lower than the melting point of a high melting point polymer after manufacturing a fabric using a core-sheath type multi-filament yarn or core-sheath mono-filament where the low melting point polymer used as a binder is the sheath and the high melting point polymer is the core, such as the sheath being a low melting point polymer with a melting point of about 160° C. to 200° C., and the core being a high melting point polyester polymer with a melting point of about 260° C., or the sheath being a low melting point polymer with a melting point of about 90° C. to 150° C., and the core being a high melting point polymer of polypropylene with a melting point of about 160° C. to 175° C., together with the warp and weft of a reinforcing woven fabric, a fabric fixed by the covering yarn can be manufactured.

The low heat shrinkage auxiliary yarn means a yarn with a dry heat shrinkage of less than 1.0% at 100° C., preferably less than 0.1%. Glass fiber yarn or polyarnide fiber yarn is referable for the auxiliary yarn and thin yarn with a yarn size of 50 denier to 800 denier is preferable for the auxiliary yarn.

Because the dry heat shrinkage of binder yarn is generally large, the auxiliary yarn (which may be the core part of a core-sheath type yarn) prevents shrinkage caused by the binder, preventing narrowing of the fiber width and preventing the woven yarn from assuming a zigzag configuration. Therefore, yarns that had been heat treated to a dry heat shrinkage of less than 1.0% should be used.

If the binder covers low heat shrinkage auxiliary yarn, the length of the line-shaped binder is securely maintained by the auxiliary yarn even after the binder has melted. This means that binder is distributed and fixed securely on the entire width of the flat warp and weft line-like, which can prevent narrowing of the width of the yarn during the prepreg processing more completely than when the binder is polymer alone.

Here, a "line-shaped" binder refers to a substantially line-like configuration of the binder, such as that provided by a fiber or fiber product (as previously exemplified) or printed line. The binder is co-woven with the constituent warp or weft. Another alternative for providing the line-shaped binder is a nonwoven web as shown in FIG. 3. In this case, too, nylon copolymer is preferred for the reason previously stated. As yet another alternative, a line-shaped binder is also imparted to the woven fabric by a printing technique in which binder paste is printed on the woven fabric. Preferably, nonwoven web is placed at least on one surface of the reinforcing woven fabric and heat pressed to melt the binder and to fix the flatness over the entire widths of the warp and weft. For such a purpose, a nonwoven web may preferably be used. This may be obtained by melt-blowing of a polymer having a low melting point using a high temperature and high speed gas jet to form either a single fiber and direct it along a travel path distributed randomly over the fabric, or more preferably, to divide a stream of molten polymer into many fibers which are then distributed randomly over the fabric. Alternatively, a spun bonded web of many previously extruded fibers can be distributed randomly to form a separate web, which is then placed on the fabric and thereafter melted.

FIG. 3 is an example of a prepreg in which nonwoven web is used. The nonwoven web 20 is placed on the surface of the reinforcing woven fabric 15 and fixes the flatness over the entire widths of the warp 16 and weft 17, i.e. over the entire area of the reinforcing woven fabric 15.

For the thermosetting resin used in the wet process for manufacturing a prepreg of a reinforcing woven fabric of this invention, epoxy resin, unsaturated polyester resin, vinyl ester resin or phenol resin are preferably employed. Of these, for the wet process for manufacturing a prepreg of this invention, prepreg manufacturing method using phenol resin is most preferable.

One example of a prepreg process for manufacturing the prepreg of this invention is illustrated with reference to FIG. 1. Diluted resin 3 is placed into the resin bath 2 installed beneath a vertically disposed dry furnace 5, and into this resin bath 2, rolled fabric 1 is dipped by drawing out at a speed of 1.5 m to 5 m per minute to impregnate resin between fibers of the fabric, which is then passed through the vertical dry furnace 5 which has a dry zone of sufficient length and carries a roll 4 at the top. Additionally, though it differs according to the fabric type, drying speed, drying temperature, resin type, solvent type and resin quantity, the appropriate height for the vertical drying furnace is 8 m to 15 m and the appropriate length of the drying zone is 2-times the height of the drying furnace, in other words, about 16 m to 30 m, because the resin impregnated fabric is dried both as it passes upwardly to and downwardly from roll 4.

Thus, as the fabric 1 impregnated with diluted resin is drawn up linearly to the roll 4 after passing through the resin bath 2, hot air at respective temperatures A and B is blown from a central direction at the fabric surface from respective blowholes 7 and 8 in side wall 6 facing the upward travel path of the fabric, thus drying the solvent to a certain degree, and then as the direction of travel of the fabric is reversed by letting the fabric pass over the roll 4, hot air is again blown from a lateral direction at the fabric surface from respective blowholes 10 and 11 in side wall 9 facing the downward travel path of the fabric to dry the remaining solvent. In addition, it is preferable for the number of hot air blowholes to be 2 to 4 in each of side wall 6, facing the upward travel path, and side wall 9, facing the downward travel path, so that hot air at different temperatures can be blown from each blowhole and control the drying condition of the solvent. Furthermore, by attaching a separator 12, at the center of the vertical drying furnace 5, parallel to the fabric surface, the drying temperature can be changed separately in each respective drying zone in which the woven fabric travels upward by and downwardly, enabling the temperature for each drying zone to be set correctly.

By winding the solvent dried fabric along with a releasing paper 14, a prepreg prepared by a wet processing method can be obtained.

To satisfy these conditions, thermosetting resin is preferably diluted with solvent of which at least 80% is a solvent incompatible with the binder, though it depends on the amount of the binder. More preferably, the entire solvent is incompatible with the binder. If more than 80% of solvent is incompatible with the binder, in other words, if less than 20% is a solvent for the binder, the dissolving speed becomes slower and at least for about 3 to 5 minutes after the fiber passes through the resin bath and enters the drying zone, in other words, until the solvent is dissolved to a certain degree and the resin viscosity becomes large, the binder continues to bind the fabric in the width direction, so that the flatness of woven yarn is not lost. As the amount of nonsolvent for the binder becomes less than 80%, the flatness of woven yarn may gradually begin to be lost and the area of the openings in the prepreg may start to increase, causing fiber distribution to be unequal, and the cover factor of the prepreg obtained gradually to decrease.

Furthermore, the amount of the solvent as a diluent for the resin is determined according to the intended amount of the thermosetting resin of the fabric and, usually, the diluted resin viscosity should be set so that the amount of the resin in the prepreg would be 30 to 60 wt %.

In addition, when drying mixed solvent of two or more different types, the hot air temperature at the first half of the drying zone in the drying process should be below the boiling point of the solvent with the lowest boiling point. If this temperature exceeds the boiling point, the solvent used to dilute the resin foams during the drying, and this foam disturbs the fiber configuration of the woven fabric and narrows the width of yarns because the crossing points are few and the yarn has no twist and entanglement. Therefore, it is preferable for the hot air temperature in the process from drying start to at least ¼ of the drying zone to be below the boiling point of the solvent. When drying progresses to a certain point, binding of fibers becomes enhanced by the gluing characteristic of the resin, so the temperature can be raised higher.

In the wet prepreg method embodying this invention, cloth prepreg may be inserted between a releasing films or a releasing paper after the solvent is dried, so the resin does not become glued to the roll. It may then be pressurized at a line pressure of 1.0 kg/cm to 50 kg/cm by a calendar roll heated to 80 to 150° C., to pass through at a feeding speed of 1 m/minute to 5 m/minute, whereupon the yarn width of the warp and weft widens and a prepreg with a flat yarn with few crossing points, and a cover factor of 100% is obtained.

The reinforcing fibers used in this invention are preferably those with a high strength and high modulus, such as glass fiber, polyamide fiber and carbon fiber. Of these, carbon fiber with a tensile modulus of 200 GPa or higher and tensile strength of 4,500 MPa or higher brings about a composite which is not only high in strength and high in modulus but also has excellent impact resistance. If the resin is a phenol resin, the carbon fibers do not become burned and the composite shows excellent fire resistance. Furthermore, the number of filaments of carbon fiber yarn used is preferably about 6,000 to 30,000 and it is preferable for carbon fiber area weight of the fabric to be about 140 $g/m^2$ to 400 $g/m^2$.

Furthermore, this invention preferably features cloth prepreg composed of twist-free, flat reinforcing fiber having a yarn width of 3 mm to 20 mm, a ratio of yarn width to yarn thickness of more than 20, a number of crossing points of the warp and weft of 2,500 to 25,000 per square meter and a cover factor of more than 90%.

Because this cloth prepreg is composed of the flat reinforcing fibers with the yarn width of 3 mm to 20 mm, a ratio of yarn width to yarn thickness of more than 20, and the number of the crossing points of the warp and weft being small, i.e., preferably, 2,500 to 25,000 per square meter, it has an excellent drape characteristic. Furthermore, because it is a fabric consisting of twist-free, flat reinforcing fiber yarn, there is no narrow part caused by twisting, and a cloth prepreg with a uniform size of opening can be obtained. Furthermore, because the cover factor is more than 90%, a cloth prepreg with reinforcing fiber dispersed uniformly can be obtained, and because the opening area is small, the mechanical characteristics are uniform.

A cloth prepreg obtainable by a method of this invention may have characteristics such that the warp and weft are composed of carbon fiber yarn, more preferably, with a number of filaments more than 12,000, the weight of carbon fiber 140 g to 240 g per square meter, and the woven density of the warp and weft almost equal. It is a cheap prepreg because it is thin and because it has a low yarn density and the carbon fiber yarns contain a large number of filaments so as to be thick, and it is lightweight with a usual resin quantity of 30 to 60 weight %.

In particular, if the resin of this invention is a phenol resin, it is preferable because the FRP obtained is excellent in incombustibility. Moreover, the FRP of this invention may have excellent fire resistance because the prepreg of this invention has a number of crossing points of the warp and weft of, preferably, 2,500 to 25,000 per square meter, the number of openings is less, the cover factor is preferably more than 90%, the opening area is small and the reinforcing fiber is a carbon fiber. Such a prepreg, in particular, blocks flame in the event of fire, and is preferably used as FRP reinforcing material of a sandwich structure that provides the side wall, galley, toilet and floor panel in an aircraft. Furthermore, it is preferably used as an interior material for trains and buses.

EXAMPLES

Fabric A

As a warp, a twist-free flat carbon fiber yarn with a number of filaments of 6,000 was circumferentially taken-out from the bobbin in a manner such as to maintain zero twist and fed to a weaving machine while maintaining the flatness of the yarn in the warp path.

The weft was, using the same carbon fiber yarn as the warp, axially taken-out in a conventional way to manufacture a fabric A with a weight of carbon fiber of 200 g per square meter, a yarn density of the warp and weft of 2.5 y/cm, and a number of crossing points in a plain weave of 62,500. The number of twists of the warp and weft composing this fabric was measured and found to be zero, whereas the weft had a number of twists of 2.6 times/m in an average of 10 yarns. The parts of the weft in which twists were present were narrow in width, and the weft, unlike the flatness in the warp, became narrow over the entire length and the fabric cover factor was 89%, and the area of the openings of the fabric was large.

Fabric B

Fabric B was manufactured by the same method as fabric A using a carbon fiber yarn with a number of filaments of 12,000, with a yarn density of the warp and weft of 1.20 y/cm, a number of crossing points in a plain weave of 14,400, and a weight of carbon fiber of 193 g per square meter. To manufacture this fabric, a low melting point nylon copolymer yarn of 70 denier, incompatible with alcohol, was distributed at the center of the weft carbon fiber yarn as a binder. This was melted by heating on the weaving machine to fix the warp and weft.

The number of twists of the warp and weft of the manufactured fabric was measured and it was found that there were none in the warp, whereas there were 3.2 twists/m in an average of 10 yarns of the weft. Similar to the fabric A, the weft flat carbon fiber was narrowed at the twisted part and, unlike the warp, became narrow, resulting in a cover factor of 80% in the fabric and the opening of the fabric was large.

Examples 1 to 2

Methanol was used as phenol resin solvent, and the amount of methanol was controlled so that a prepreg resin weight ratio WR of about 40% at a processing speed of the prepreg of 1.5 m/minute was prepared using the apparatus in FIG. 1.

The diluted resin was placed in the resin bath 2 set below the vertical drying furnace 5, and into this resin bath 2, a rolled fabric A was dipped by drawing out at a speed of 1.5 m/minute, to impregnate resin in the fibers of the fabric. Fabric was then passed through the vertical drying furnace 5 carrying a roll 4 at the top of the furnace at a height of 10 m from the entrance to the drying furnace 5. The fabric impregnated with diluted resin was drawn up linearly to the roll 4 after passing through the resin baths, and hot air was blown in a lateral direction on to the fabric surface from the side wall 6 facing the travel path of the upwardly moving fabric, thereby drying the solvent to a certain degree, and then reversing the direction of travel of the fabric by allowing the fabric to pass over the roll 4, after which hot air is blown in a lateral direction onto the fabric surface from the side wall 9 facing the travel path of the downwardly moving fabric to dry the remaining solvent.

Under the conditions such that the prepreg temperature impregnated with this resin was 80° C., the yarn was widened at a line pressure of 9.8 kg/cm by the calendar roll heated to 100° C., and prepreg was wound inserting a releasing paper. In the same way, using fabric B, prepreg B was manufactured. The cover factors of the processed prepregs were measured, for which the results are indicated in Table 1.

Comparative Examples 1 to 2

Using the fabric A and B, the solvent was dried in the drying furnace to manufacture prepregs, and the prepregs A and B were wound inserting a releasing paper, under the same conditions as in Examples 1 and 2, except for the fact that the yarn widening operation by the calendar roll was omitted, in contrast to Examples 1 and 2. The cover factors of the prepregs after the processing were measured, for which results are indicated in Table 1.

Fabrics were manufactured, using a flat carbon fiber yarn, but due to the fact that twisting occurred in the weft in the course of fabric manufacturing, the resulting fabrics had large opening area and a cover factor of 89% for the fabric A and 80% for the fabric B.

When this was processed by a conventional method of wet prepreg processing, the cover factor for fabric A was 83% and for fabric B, 82%. In either case, the cover factor became smaller than that of the original fabric and the average area of prepreg opening was as large as 72 mm$^2$ per opening and 12.50 mm$^2$ per opening respectively (Comparative examples 1 and 2).

On the other hand, the cover factors of the prepregs that underwent yarn widening by means of the calendar roll was 99% for fabric A and 98% for fabric B, both of which had a considerably larger cover factor than the original fabric and in both of which the fabric yarn widening had been achieved sufficiently. Furthermore, the average area per opening of prepreg became smaller, as 0.16 mm$^2$ and 1.39 mm$^2$ respectively, and prepregs excellent in quality with uniformly dispersed carbon fiber were obtained (Examples 1 and 2).

TABLE 1

|  | Example | | Comparative Example | |
| --- | --- | --- | --- | --- |
|  | 1 | 2 | 1 | 2 |
| Reinforcing fiber | Carbon fiber | | | |
| Type of fabric | Fabric A | Fabric B | Fabric A | Fabric B |
| Number of filaments of reinforcing yarn | 6,000 | 12,000 | 6,000 | 12,000 |
| Woven density (y/cm): warp | 2.5 | 1.20 | 2.5 | 1.20 |
| weft | 2.5 | 1.20 | 2.5 | 1.20 |
| Twisting number warp | 0 | 0 | 0 | 0 |
| (times/m): weft | 2.6 | 3.2 | 2.6 | 3.2 |
| Fiber area weight of woven fabric | 200 | 193 | 200 | 193 |
| Number of crossing points (pieces/m$^2$) | 62,500 | 14,400 | 62,500 | 14,400 |
| Woven construction | Plain | | | |
| Cover factor of woven fabric (%) | 89 | 80 | 89 | 85 |
| Low melting point binder polymer | — | Nylon copolymer mp: 145° C. | — | Nylon copolymer mp: 145° C. |
| Binder position | — | Weft | — | Weft |
| Binder quantity (g/m$^2$) | — | 0.9 | — | 0.9 |
| Resin type | Phenol resin | | | |
| Calendar rolling | Applied | | Not applied | |
| Cover factor of prepreg (%) | 99 | 98 | 83 | 82 |
| Average area of per prepreg opening (mm$^2$) | 0.16 | 1.39 | 2.72 | 12.50 |

Example 3 to 11, Comparative Examples 3 to 5

Using fabric C with a yarn width of 6.5 mm, a ratio of yarn width to yarn thickness of 65, twist-free and flat, composed of carbon fiber yarn with a number of filaments of 12,000 and a yarn density of the warp and weft of 1.25 y/cm, a number of crossing points in a plain weave of 15,600 per square meter, and a weight of carbon fiber of 200 g per square meter and fabric D with a yarn density of the warp and weft of carbon fiber yarn (the same as the abovementioned reinforcing fiber) of 1.00 y/cm, a number of crossing points of 10,000 per square meter in a plain weave, and a weight of carbon fiber of 160 g per square meter, fixed fabrics with a width of 100 cm were manufactured, by doubling binder yarns located at the center of the yarn width of the warp and/or weft, each of which binder yarns consisted of a sheath yarn of a low melting point nylon copolymer, low melting point polyester or polyethylene compatible with alcohol as a covering binder component, spirally wound around glass fiber yarn ECE 225, 1/0, as an auxiliary yarn component. These fabrics were wound on a roll of 30 m each.

In addition, using the same carbon fiber yarn as used in Fabrics C and D, a carbon fabric with a yarn density of the warp and weft 1.20 y/cm, a number of crossing points in a plain weave 14,400 per square meter, and a weight of carbon fiber 193 g per square meter was prepared and laminated and integrated with a nonwoven web of a low melting point polyester having a weight of 5 g/m$^2$ by calendering with rollers heated to 160° C. Thus, Fabric E was prepared. Similarly Fabric F was also prepared in which the carbon fiber fabric had a yarn density of the warp and weft of 1.00 y/cm, a number of crossing points of 10,000 per square meter, and a weight of carbon fiber of 160 g per square meter. These fabrics were also wound on a roll of 30 m each.

As the resin of a wet prepreg process, phenol resin was used and as solvent, methanol, MEK and a mixed solvent of MEK and methanol in a weight ratio of 90:10 were prepared. Resin dilution was adjusted so the resin weight content of the prepreg would be about 40%, under the conditions of a processing speed of the prepreg of 2.5 m/min. The fabric type, binder type and combination of solvent used in the experiment are given in Tables 2 to 4.

A diluted resin was placed in the resin baths located beneath the vertical furnace dryer 5, into this resin bath, a rolled fabric was dipped by drawing out at a speed of 2.5 m/min. to impregnate resin between the fibers of fabric. This was passed through the vertical type drying furnace 5 carrying a roll 4 at the top at the height of 10 m. The fabric impregnated with the diluted resin was drawn up linearly to the roll 4 after passing through the resin bath, and hot air at respective temperatures A and B was blown in a lateral direction onto the fabric surface from a side wall 6 facing the upwardly moving travel path of the fabric, drying the solvent to a certain degree, and then reversing the direction of travel of the fabric by allowing the fabric to pass over the roll 4, after which hot air at temperatures C and D was blown in a transverse direction onto the fabric surface from a side wall 9 of the downwardly moving travel path to dry the remaining solvent. Then prepreg was wound while inserting a releasing paper. A separator is attached at the center of the vertical drying furnace in parallel with the fabric, so the drying temperature at the top side of fabric and processing side can be changed. The hot air temperatures are shown in Tables 2 to 4.

This prepreg was passed through a calendar roll heated to 100° C. at a line pressure of 20 kg/cm and feeding speed of 1 m/min.

The cover factor of the prepreg after the abovementioned wet prepreg processing and calendar processing were completed were measured, the results of which are shown in Tables 2 to 4.

TABLE 2

|  | Example | | | |
|---|---|---|---|---|
|  | 3 | 4 | 5 | 6 |
| Reinforcing fiber | Carbon fiber | | | |
| Type of fabric | C | | | |
| Number of filaments of reinforcing yarn | 12,000 | | | |
| Woven density (y/cm) Warp | 1.25 | | | |
| Weft | 1.25 | | | |
| Fiber area weight of woven fabric | 200 | | | |
| Number of crossing points (pieces/m²) | 15,630 | | | |
| Woven construction | Plain | | | |
| Cover factor of woven fabric (%) | 97 | | | |
| Low melting point binder polymer | Nylon copolymer mp: 120° C. | | | |
| Binder position | Warp and Weft | Weft | Warp and Weft | Warp and Weft |
| Binder quantity (g/m²) | 1.4 | | | |
| Auxiliary yarn | None | | | |
| Resin type | Phenol resin | | | Epoxy resin |
| Type and mixing ratio of solvent | MEK — | MEK/ MeOH 90/10 | MEK — | |
| Boiling point of solvent | 80 | 65 | 80 | |
| Hot air temperature: | | | | |
| A | 75 | 60 | 75 | |
| B | 75 | 70 | 80 | |
| C | 100 | 90 | 100 | |
| D | 100 | 90 | 100 | |
| Cover factor of prepreg (%) | 95 | 94 | 96 | 95 |
| Cover factor of prepreg after calendar (%) | 100 | | | |

Note:
MeOH means methanol

TABLE 3

|  |  | Comparative example | | |
|---|---|---|---|---|
|  | Example 7 | 3 | 4 | 5 |
| Reinforcing fiber | Carbon fiber | | | |
| Type of fabric | C | | D | C |
| Number of filaments of reinforcing yarn | 12,000 | | | |
| Woven density (y/cm): Warp | 1.25 | | 1.00 | 1.25 |
| Weft | 1.25 | | 1.00 | 1.25 |
| Fiber area weight of woven fabric | 200 | | 160 | 200 |
| Number of crossing points (pieces/m²) | 15,300 | | 10,000 | 15,300 |
| Woven construction | Plain | | | |
| Cover factor of woven fabric (%) | 97 | | 99 | 97 |
| Low melting point binder polymer | Copolyester mp: 170° C. | Nylon copolymer mp: 120° C. | Nylon copolymer mp: 120° C. | Copolyester mp: 170° C. |
| Binder position | Warp and Weft | | | |
| Binder quantity (g/m²) | 0.8 | 1.4 | 1.3 | 1.4 |

TABLE 3-continued

|  | Example 7 | Comparative example | | |
|---|---|---|---|---|
|  |  | 3 | 4 | 5 |
| Auxiliary yarn |  | None | Warp GF yarn | None |
| Resin type |  | Phenol resin | | |
| Type and mixing ratio of solvent |  | MeOH | | MEK |
| Boiling point of solvent |  | 65 | | 80 |
| Hot air temperature |  |  |  |  |
| A |  | 60 |  | 90 |
| B |  | 70 |  | 100 |
| C |  | 90 |  | 100 |
| D |  | 90 |  | 100 |
| Cover factor of prepreg (%) | 95 | 45 | 40 | 80 |
| Cover factor of prepreg after calendar (%) | 100 | 65 | 70 | 95 |

TABLE 4

|  | Example | | | |
|---|---|---|---|---|
|  | 8 | 9 | 10 | 11 |
| Reinforcing fiber |  | Carbon fiber | | |
| Type of fabric | C | D | E | F |
| Number of filaments of reinforcing yarn |  | 12,000 | | |
| Woven density (y/cm): Warp | 1.00 | 1.00 | 1.21 | 1.00 |
| Weft | 1.00 | 1.00 | 1.21 | 1.00 |
| Fiber area weight of woven fabric | 200 | 160 | 193 | 160 |
| Number of crossing points (pieces/m$^2$) | 15,300 | 10,000 | 14,400 | 10,000 |
| Woven construction |  | Plain | | |
| Cover factor of woven fabric (%) | 97 | 99 | 97 | 98 |
| Low melting point binder polymer | Polyethylene mp: 130° C. | Nylon copolymer mp: 120° C. | Copolyester mp: 170° C. | |
| Binder position | Weft | Warp and Weft | Nonwoven web | |
| Binder quantity (g/m$^2$) | 0.8 | 1.3 | 5.0 | |
| Auxiliary yarn | None | Warp GF yarn | None | |
| Resin type |  | Phenol resin | | |
| Type of solvent A | MeOH | MEK | MeOH | |
| Mixing ratio of solvent | — | — | — | |
| Boiling point of solvent | 65 | 80 | 65 | |
| Hot air temperature |  |  |  |  |
| A |  | 60 |  | 90 |
| B |  | 70 |  | 100 |
| C |  | 90 |  | 100 |
| D |  | 90 |  | 100 |
| Cover factor of prepreg (%) | 97 | 95 | 96 | 98 |
| Cover factor of prepreg after calendar (%) |  | 100 | | |

From the abovementioned Examples 3 to 11 and Comparative Examples 3 to 5, the following conclusions can be drawn.

A. When methanol compatible with low melting point nylon is used as a solvent, the yarn width becomes narrow, resulting in a prepreg of a small cover factor (Comparative Examples 3 and 4). By using MEK, a solvent incompatible with low melting point nylon, the cover factor of the cloth prepreg becomes slightly smaller as compared with fabrics before prepreg processing, but despite this fact, prepregs with a high cover factor of 90% or higher were obtained. (Examples 3, 4, 6 and 9).

B. Mixing about 10% of methanol, a solvent which can dissolve the binder, with MEK, a nonsolvent of the binder can give a fixing effect, resulting in a prepreg with a high cover factor of 90% (Example 5).

C. Even when the binder polymer is a low melting point polyester or polyethylene, the same effect as A is attained using methanol, an incompatible solvent (Examples 7 and 8).

D. When the hot air temperatures A and B at the start of the drying process is raised to temperatures higher than the boiling point of the solvent, the flatness of woven yarn is decreased and a prepreg with a small cover factor of 80% is obtained (Comparative Example 5). However, by setting the temperature of the hot air in ½ of the drying zone below the boiling point, a prepreg with a high cover factor of 95% or more was obtained (Example 3).

E. By passing a prepreg through a calendar, the woven yarn is widened and a prepreg of cover factor of 94% to 97% is improved to 100%. A prepreg with the carbon fiber completely dispersed was obtained (Example 3 to 9).

As described above, with a prepreg of a reinforcing woven fabric embodying this invention and its manufacturing method, a prepreg fabric with a large cover factor can be obtained, because after a fabric, substantially composed of twist-free reinforcing fiber yarn with a small number of crossing points of the warp and weft, is impregnated with resin, or during impregnation, the yarn of the fabric is widened by a pressurization roll.

Furthermore with the prepreg of this invention, because a thin prepreg is obtained with a thick reinforcing fiber yarn, a low cost and lightweight product can be obtained.

Moreover, because there is no large opening in the woven fabric in the prepreg, and fibers are dispersed uniformly, no defect is produced on forming a honeycomb sandwich structure by a honeycomb cocuring method, and this invention provides an excellent interior material of aircraft.

Furthermore, with the wet process for manufacturing prepreg of a reinforcing woven fabric of this invention, and prepreg manufactured by that method, woven yarns do not lose their width during wet prepreg process even if the woven density is very low, and cloth prepreg with no opening between the woven yarns can be obtained.

This cloth prepreg is low in cost and lightweight because a thin prepreg is obtained from thick reinforcing fiber yarns. Because there is no opening between the woven yarns and the fibers are dispersed uniformly, the mechanical characteristics of the composite material are uniform and give an excellent effect as an interior material.

The invention claimed is:

1. A wet process for manufacturing a cloth prepreg comprising placing a binder in a form of a non-woven web on a woven fabric comprising warp and weft yarns, heat-pressing the non-woven web to melt the binder and to fix the flatness of the warp and weft yarns, and subsequently impregnating the woven fabric with a diluted resin by dipping the woven fabric into and passing through the diluted resin placed in a resin bath and drawing out the woven fabric impregnated with the diluted resin from the resin bath and drying the woven fabric impregnated with the diluted resin, wherein after the wet process the woven fabric has a number of crossing points of the warp and weft yarns in the range of 2,000 to 70,000/m$^2$, wherein the diluted resin comprises a solvent, at least 80% of the solvent being incompatible with the binder.

2. A process according to claim 1, wherein after the wet process the number of crossing points is in the range of 2,500 to 25,000/m$^2$ and the woven fabric has a cover factor of 90% or more, further wherein the warp and weft yarns have a width of 3 to 20 mm and a flatness defined by a ratio of a yarn width to a yarn thickness of 20 or more.

3. A process according to claim 1, wherein the binder is imparted on the woven fabric in an amount of 0.5 to 15 g/m$^2$.

4. A process according to claim 1, wherein the binder comprises a nylon copolymer incompatible with alcohol and the solvent comprises an alcohol-containing or non-alcohol-containing solvent.

5. A process according to claim 1, wherein the drying is a hot air drying.

6. A process ascertaining to claim 5, wherein the fabric impregnated with the diluted resin passes through a hot air drying zone in which the hot air temperature in the first ¼ of the hot air drying zone is below the boiling point of the solvent.

7. A process according to claim 1, wherein the resin is a thermosetting phenol resin.

8. A process according to claim 1, wherein each of the warp and weft yarns comprises a carbon fiber multi-filament yarn.

9. A process according to claim 1, wherein each of the warp and weft yarns comprises a multi-filament yarn having a number of filaments of 6,000 to 24,000.

10. A process according to claim 1, wherein the binder comprises a covering layer formed on an auxiliary yarn having a low dry heat shrinkage of less than 1.0% at 100° C.

11. The process of claim 1, wherein said dipping the woven fabric into and passing through the diluted resin placed in the resin bath and drawing out the woven fabric impregnated with the diluted resin from the resin bath is at a speed of 1.5 m/minute to 5 m/minute.

12. The process of claim 1, wherein the non-woven web consists of a polymer that melts on heating.

* * * * *